US012614441B1

(12) United States Patent
Alarfaj et al.

(10) Patent No.: US 12,614,441 B1
(45) Date of Patent: Apr. 28, 2026

(54) SYSTEM AND METHOD FOR INDOOR TAG LOCALIZATION AND IDENTIFICATION

(71) Applicant: KING FAISAL UNIVERSITY, Al-Ahsa (SA)

(72) Inventors: Mohammed Alarfaj, Al-Ahsa (SA); Azzam Almadini, Al-Ahsa (SA); Ali Alharbi, Al-Ahsa (SA); Mustafa Althunayyan, Al-Ahsa (SA); Osama Alrubayyi, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 19/384,135

(22) Filed: Nov. 10, 2025

(51) Int. Cl.
G08B 21/04 (2006.01)
G06V 20/52 (2022.01)
H04W 4/33 (2018.01)

(52) U.S. Cl.
CPC ......... G08B 21/0446 (2013.01); G06V 20/52 (2022.01); G08B 21/0453 (2013.01); H04W 4/33 (2018.02)

(58) Field of Classification Search
CPC ................................................. G08B 21/0446
USPC ....................................................... 340/573.1
See application file for complete search history.

(56) References Cited

U.S. PATENT DOCUMENTS

| | | | |
|---|---|---|---|
| 9,740,895 B1 | 8/2017 | Liu et al. | |
| 10,037,475 B2 | 7/2018 | Moshfeghi | |
| 2007/0132597 A1* | 6/2007 | Rodgers | G06Q 10/10 348/E7.078 |
| 2007/0136102 A1* | 6/2007 | Rodgers | G06Q 10/087 348/E7.078 |

(Continued)

FOREIGN PATENT DOCUMENTS

| | | |
|---|---|---|
| CN | 106447585 A | 2/2017 |
| CN | 213634639 U | 7/2021 |

(Continued)

OTHER PUBLICATIONS

Shewell, et al., "Indoor localisation through object detection within multiple environments utilising a single wearable camera", DOI: https://doi.org/10.1007/s12553-016-0159-x (2017).
Kunhoth, et al., "Indoor positioning and wayfinding systems: a survey", DOI: https://doi.org/10.1186/s13673-020-00222-0 (2020).
Huang et al., "An Integrated Wireless Wearable Sensor System for Posture Recognition and Indoor Localization", DOI: 10.3390/s16111825 (2016). Abstract.

(Continued)

*Primary Examiner* — Travis R Hunnings
(74) *Attorney, Agent, or Firm* — Nath, Goldberg & Meyer; Joshua B. Goldberg

(57) ABSTRACT

A system and method for indoor tag localization and identification are disclosed. The system includes one or more environment-specific tags positioned at known locations within an indoor environment and a user-associated imaging device (UAID) carried by or attached to a user. The UAID includes a camera configured to capture images of the environment and a user tag for external identification. An image-tag processing system (ITPS) executes one or more trained convolutional neural network (CNN) models to identify environment tags, determine a location and orientation of the UAID relative to the tags, and identify the UAID and its associated user. The ITPS may also process motion or physiological sensor data and generate alerts or map updates. The system enables accurate, real-time indoor localization, user identification, and event detection within facilities such as hospitals, care centers, or industrial environments.

20 Claims, 6 Drawing Sheets

(56) References Cited

U.S. PATENT DOCUMENTS

| | | | | |
|---|---|---|---|---|
| 2007/0159332 | A1* | 7/2007 | Koblasz ................. | A61B 5/411 340/572.1 |
| 2007/0162304 | A1* | 7/2007 | Rodgers ............... | A61B 5/1113 348/E7.078 |
| 2007/0194939 | A1* | 8/2007 | Alvarez ................. | A61B 5/411 348/E7.086 |
| 2007/0288263 | A1* | 12/2007 | Rodgers ................. | G08B 21/22 705/2 |
| 2009/0091458 | A1* | 4/2009 | Deutsch ................. | G16H 40/20 705/2 |
| 2012/0185267 | A1* | 7/2012 | Kamen ................ | A61B 5/0024 705/2 |
| 2015/0109442 | A1* | 4/2015 | Derenne ................ | H04N 7/185 348/143 |
| 2015/0318015 | A1* | 11/2015 | Bose .................... | G08B 21/043 386/248 |
| 2018/0041735 | A1* | 2/2018 | Vagelos ................. | H04N 7/185 |
| 2023/0336694 | A1* | 10/2023 | Wexler ................... | G10L 25/63 |

FOREIGN PATENT DOCUMENTS

| | | |
|---|---|---|
| EP | 3258287 A1 | 12/2017 |
| EP | 3605473 A1 | 2/2020 |
| IN | 202311037592 A | 6/2023 |

OTHER PUBLICATIONS

Morar, et al. "A Comprehensive Survey of Indoor Localization Methods Based on Computer Vision", DOI: 10.3390/s20092641 (2020).

Plikynas, et al., "Indoor Navigation Systems for Visually Impaired Persons: Mapping the Features of Existing Technologies to User Needs", DOI: https://doi.org/10.3390/s20030636 (2020).

Miura, et al., "3D human pose estimation model using location-maps for distorted and disconnected images by a wearable omni-directional camera", DOI: https://doi.org/10.1186/s41074-020-00066-8 (2020).

* cited by examiner

SYSTEM AND METHOD FOR INDOOR TAG LOCALIZATION AND IDENTIFICATION

BACKGROUND

Field of

The disclosure of the present patent application relates to systems and methods for indoor localization and user identification, and more particularly to user-associated imaging devices, and image processing systems configured to determine a position, orientation, user identity, and/or imaging device associated within an indoor environment using environment-specific image tags, imaging device tags, and convolutional neural network (CNN)-based image analysis.

Description of Related Art

Wearable electronic devices are increasingly used for health monitoring, communication, and activity tracking. While global positioning systems (GPS) provide effective outdoor localization, they do not function reliably indoors. Existing alternatives such as Wi-Fi, Bluetooth, or radio-frequency methods often exhibit reduced accuracy or susceptibility to interference.

Image-based localization techniques using visual tags or markers have been developed to improve location precision in indoor settings. However, these systems generally lack an integrated means for identifying individual users or combining location data with user physiological or motion information. In addition, known motion-sensing systems, such as those employing inertial measurement units (IMUs), can detect movement patterns or falls but do not provide precise spatial information or context within a larger indoor area.

Accordingly, there is a continuing need for a comprehensive system that provides accurate localization, reliable user identification, and integrated sensing and communication capabilities suitable for indoor environments.

SUMMARY

The present disclosure provides systems and methods for indoor tag localization and identification that enable accurate, real-time determination of a user's position and identity within an indoor environment.

In certain embodiments, the system includes one or more environment-specific tags disposed at predetermined locations within the indoor environment, each tag including a unique identifier associated with its corresponding location. A user-associated imaging device (UAID) is carried by or attached to a user and includes a camera directed outward from the user, a processor, a memory, and a user-specific tag. The UAID camera captures images of the surrounding indoor environment, including one or more environment-specific tags.

The system further includes a fixed camera positioned within the environment and configured to capture images of the UAID tag. An image-tag processing system (ITPS) having one or more trained convolutional neural network (CNN) models receives image data from the UAID and from the fixed camera. The ITPS processes the image data to (i) identify environment-specific tags, (ii) determine an indoor environment location and distance of the UAID relative to a detected tag, and (iii) identify the UAID and its associated user. The ITPS then provides output information via an output device, which may include a visual, audible, haptic, or wireless transmission output.

In some embodiments, the UAID further includes an inertial measurement unit (IMU) configured to measure linear acceleration and angular velocity. The ITPS may receive the IMU data and detect a fall or abnormal movement pattern. Upon such detection, the ITPS can generate an alert message that includes the user's identification and current position, and may transmit or present the alert through one or more output modalities such as visual indicators, audible notifications, tactile feedback, or wireless communication to a remote server or device.

In other embodiments, the UAID may be implemented as a smartwatch, smart bracelet, or other wearable device, optionally including one or more physiological sensors configured to measure parameters such as heart rate, blood oxygen level, body temperature, or blood pressure. The UAID may alternatively be mounted to a mobile platform, such as a wheelchair, bed, cart, or walker.

The image-tag processing system may further determine a pose vector of the UAID relative to an environment-specific tag based on geometric distortion in captured images, allowing accurate estimation of orientation and distance. The pose vector, which may also be referred to as a position vector, represents the position and/or location of the UAID with respect to the environment-specific tag at the time an image of the environment-specific tag is captured by the UAID. The position and/or location being determined in connection with the derived distance and orientation of the UAID relative to the environment-specific tag by the image-tag processing system.

The disclosed systems and methods thus integrate image-based indoor localization, user identification, motion detection, and physiological monitoring within a unified wearable and processing framework. These features enable accurate and reliable tracking of users and assets within indoor environments, support automated fall detection and alerting, and facilitate seamless communication with remote monitoring systems or emergency responders.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1A:
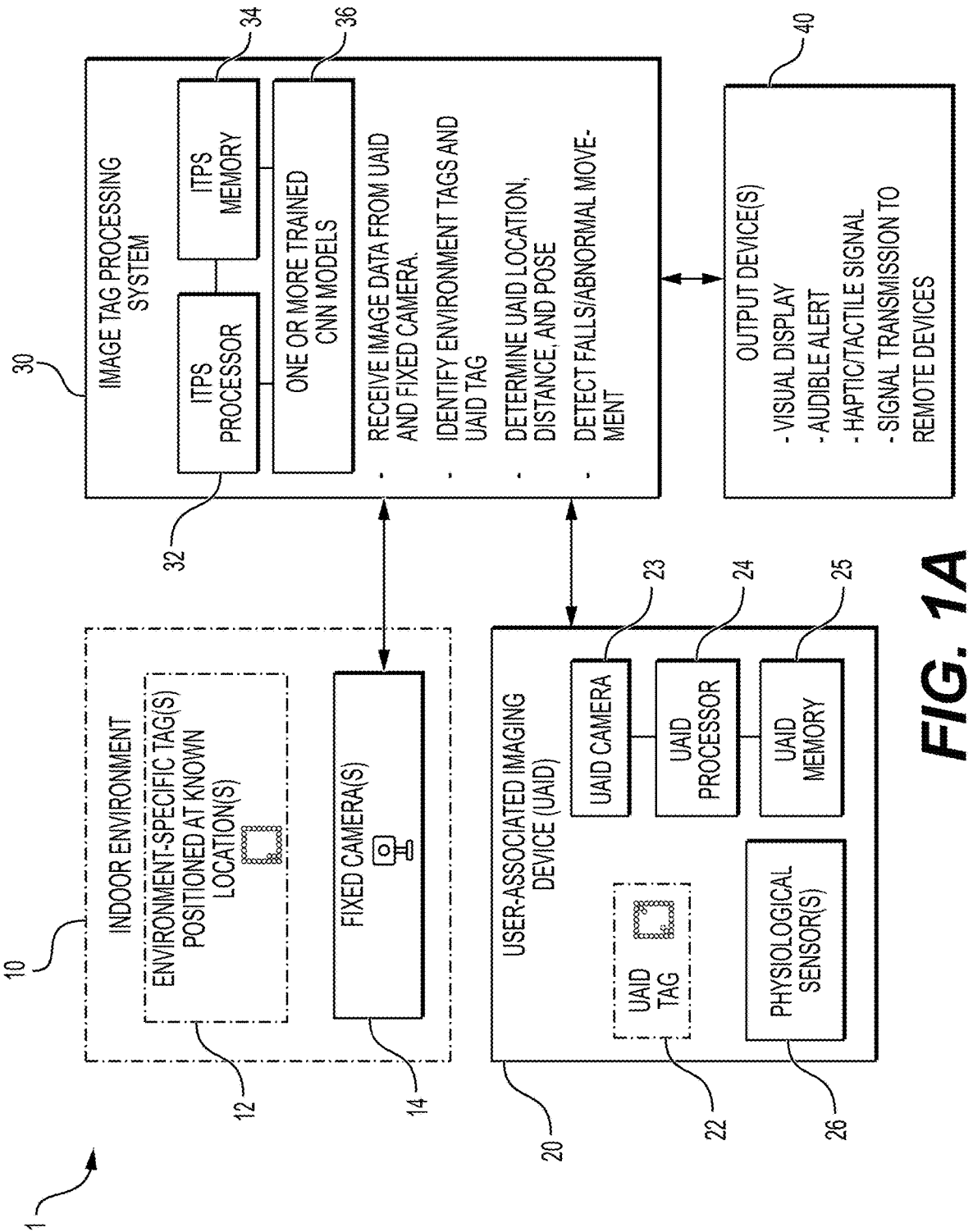
FIG. 1A is a system block diagram of an exemplary indoor localization and identification system using an image-tag processing system.
Figure 1B:
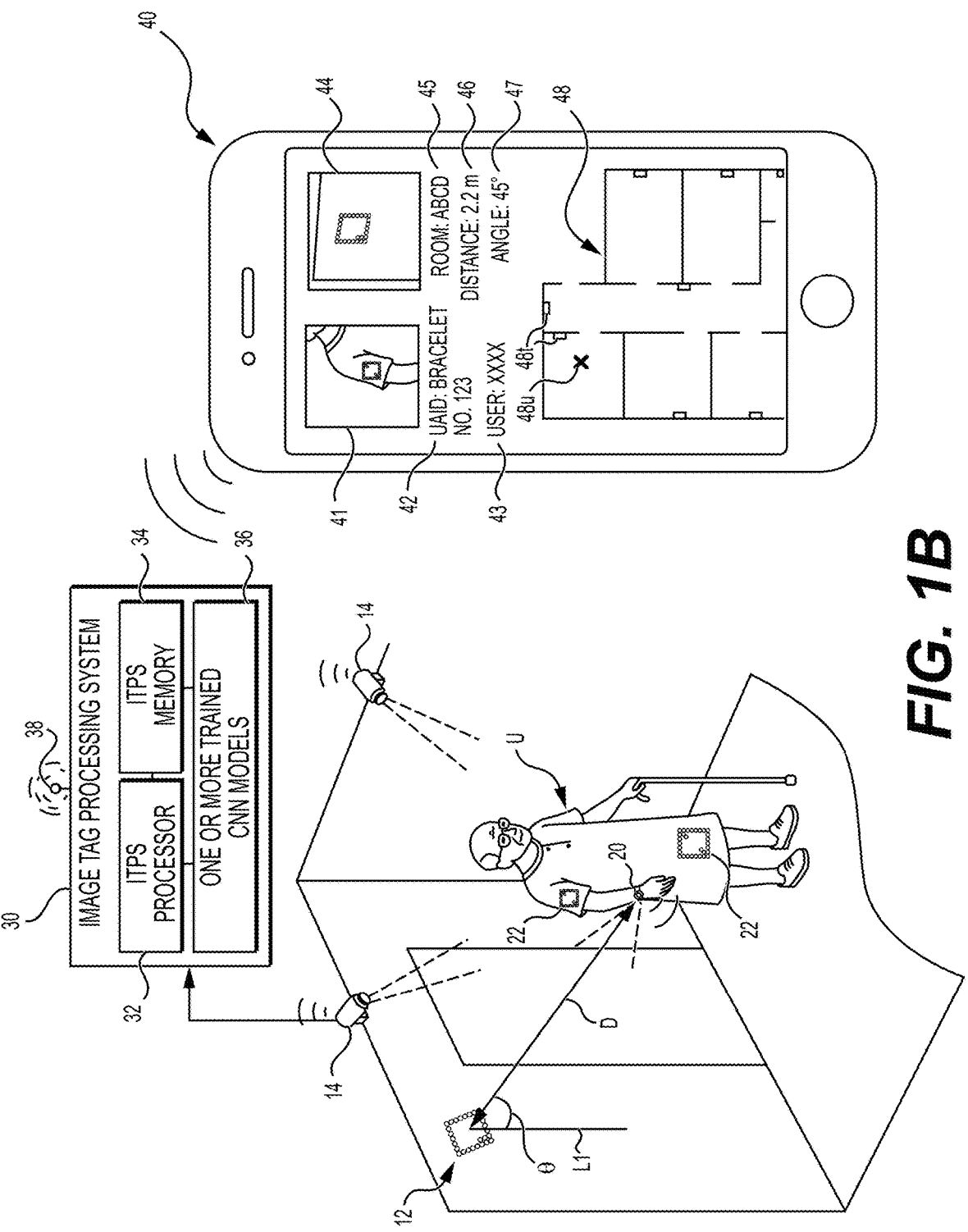
FIG. 1B is an embodiment of the system of FIG. 1A illustrating an exemplary indoor environment and a user carrying a UAID in the form of a smartwatch or smart bracelet.

Referring now to FIGS. 1A-1B, there is shown an exemplary indoor localization and identification system (also referred to herein as just "system") 1 configured to determine a position, orientation, and user identity within an indoor environment. FIG. 1A is a block diagram of the main hardware components of the system, while FIG. 1B depicts a particular non-limiting embodiment of the system 1 in which the user-associated imaging device (UAID) 20 is a smartwatch or smart bracelet. The system 1 involves an indoor environment 10 containing one or more environment-specific tags 12 and one or more fixed cameras 14. As shown in FIG. 1A, the at least one user-associated imaging device (UAID) 20 includes a UAID tag 22, UAID camera 23, UAID processor 24, UAID memory 25, and optional physiological sensor(s) 26. An image-tag processing system (ITPS) 30 receives image data from UAID 20 and fixed camera(s) 14. ITPS 30 includes an ITPS processor 32, ITPS memory 34, and one or more trained convolutional neural network (CNN) models 36 for processing image data. One or more output devices 40 provide visual, audible, tactile, or signal outputs based on processed data. Output devices 40 may be incorporated into ITPS 30 and/or may be a remote device or devices.

Indoor environment 10, which could be a hospital, nursing home, warehouse, or prison, to name a few non-limiting examples, includes one or more environment-specific tags 12 positioned at predetermined, known locations. Each tag 12 includes a unique identifier associated with a corresponding location or region. In various embodiments, the tags 12 comprise geometric features optimized for machine-vision localization. The fixed cameras 14 are mounted within the indoor environment 10 and oriented to capture images of UAID tags 22, registered with each user-associated imaging device 20.

Each UAID 20 is carried by, worn, or positioned proximate to a user U, such that the UAID camera 23 faces outward to capture images of the surrounding indoor environment 10 including any visible environment-specific tags 12. The UAID tag 22 provides a unique visual identifier for external identification of the registered UAID 20 and its associated user by the fixed cameras 14. The UAID processor 24 and UAID memory 25 store and preprocess image data, motion data, and physiological data prior to transmit to the image-tag processing system 30. In some embodiments, the UAID 20 incorporates one or more physiological sensors 26 configured to measure user parameters such as heart rate, body temperature, blood oxygen saturation, blood pressure, or combinations thereof.

The image-tag processing system 30 receives environment image data from the UAID camera 23 and user tag image data from the fixed cameras 14, and processes the data using one or more trained CNN models 36 executed by the ITPS processor 32 and stored in ITPS memory 34. The CNN model(s) 36 are configured to provide tag detection and classification as outputs, which are used by ITPS 30 to determine the position, distance, and orientation (pose) of each UAID 20 relative to a detected environment-specific tag 12. The ITPS 30 and one or more CNN models 36 may also identify the UAID tag 22 within images captured by the fixed camera 14 to determine a UAID identifier and associated user identity. The UAID identifier may comprise a unique code or signature associated with each user-associated imaging device 20, such as a serial number, alphanumeric tag code, embedded chip identifier, RFID or Bluetooth® MAC address, or a system-assigned registration code. The user identity may comprise data that associates the UAID 20 with a particular person or user profile, such as a patient name, medical record number (MRN), personnel badge number, student or visitor identification, biometric identifier, or an anonymized or encrypted user code in privacy-sensitive environments. The ITPS 30 may access a registration database or user management system in which the UAID identifier and user identity are linked, thereby enabling automated recognition of the user and correlation of positional and physiological data with the corresponding individual. The examples of various identifiers for the UAID 20 and the user described herein are non-limiting examples and it should be understood that other such identifiers fall within the scope of the present disclosure.

In some embodiments, the UAID 20 further includes an inertial measurement unit (IMU) configured to provide linear-acceleration and angular-velocity data to the ITPS 30. The ITPS 30 may combine the IMU data with CNN-derived tag localization results and, where available, altitude information from a barometric sensor to compute a three-dimensional position of the UAID 20 within the indoor environment 10. The ITPS 30 may also detect a fall or abnormal movement pattern based on IMU signals or motion inconsistencies inferred from image sequences.

Upon determining the UAID's location and user identity, the ITPS 30 communicates the resulting information to one or more output devices 40. The output devices 40 may include a local display, speaker, or haptic actuator, or a wireless transmitter that communicates with a remote computing device or cloud-based monitoring server. The server may record time-stamped tag detections and produce a facility-wide occupancy or movement map identifying the positions of all active UAIDs 20 and users. When a fall or abnormal event is detected, the ITPS 30 generates an alert message that includes the user identifier, UAID identifier, and current indoor position, and causes the output device 40 to issue an audible, visual, haptic, or wireless alert signal, or a combination thereof.

Referring particularly to FIG. 1B, an illustrative implementation of the system 1 within an indoor environment 10 is shown. One or more fixed cameras 14 capture images of the user-associated imaging device 20 and one or more environment-specific tags 12 located on walls or structures. Each tag 12 defines a perpendicular reference line L1 used for angular and distance measurement. The UAID 20, carried by the user U, is oriented so that the UAID camera 23 captures the surrounding environment including visible tags 12. The ITPS 30 determines a distance D between the UAID 20 and a detected tag 12, and an angular orientation θ between the optical axis of the UAID 20 and the reference line L1 perpendicular to the tag 12.

In some embodiments, the UAID camera 23 may be configured to capture images of the surrounding environment automatically in response to a triggering condition. The triggering condition may include, for non-limiting example, detection that the UAID 20 is stationary for a predetermined time interval, detection of a motion event such as a fall or abrupt stop, receipt of a capture command from the ITPS 30, or periodic image acquisition at defined time or distance intervals. Automatic image capture may conserve power and reduce processing load by acquiring image data only when positional changes are detected or when the UAID 20 is in a steady state suitable for high-accuracy localization.

Each image captured under these conditions may be time-stamped and transmitted to the ITPS 30 for processing and recordation. The ITPS 30 may use the received time-stamped image data to update an indoor environment map, maintain a historical log of user movements, or generate a facility-wide occupancy map identifying active UAIDs and their corresponding user locations in real time.

The ITPS 30, using the CNN models 36, processes received images to compute the position and orientation of the UAID 20 relative to known tag coordinates. Output device 40, which may be a mobile terminal or smartphone, displays results including a UAID tag image 41, an environment tag image 44, corresponding UAID identifier 42 and user identifier 43, a room or location identifier 45, and numerical outputs such as distance 46 and angle 47. The output interface also displays an indoor environment map 48 showing environment tags 48t and a user location marker 48u corresponding to the current computed position of the UAID 20.

The depiction of FIG. 1B thus illustrates a non-limiting example of a real-time operation of the system 1 in determining the position, orientation, and identity of a user within a tagged indoor environment and visually presenting this information through an output device 40 for monitoring, safety, or facility-management applications. The particular arrangement of cameras, tags, and user interfaces shown in FIG. 1B is illustrative and not limiting; other configurations, display formats, or viewing geometries may be employed without departing from the scope of the present disclosure.

Figure 2:
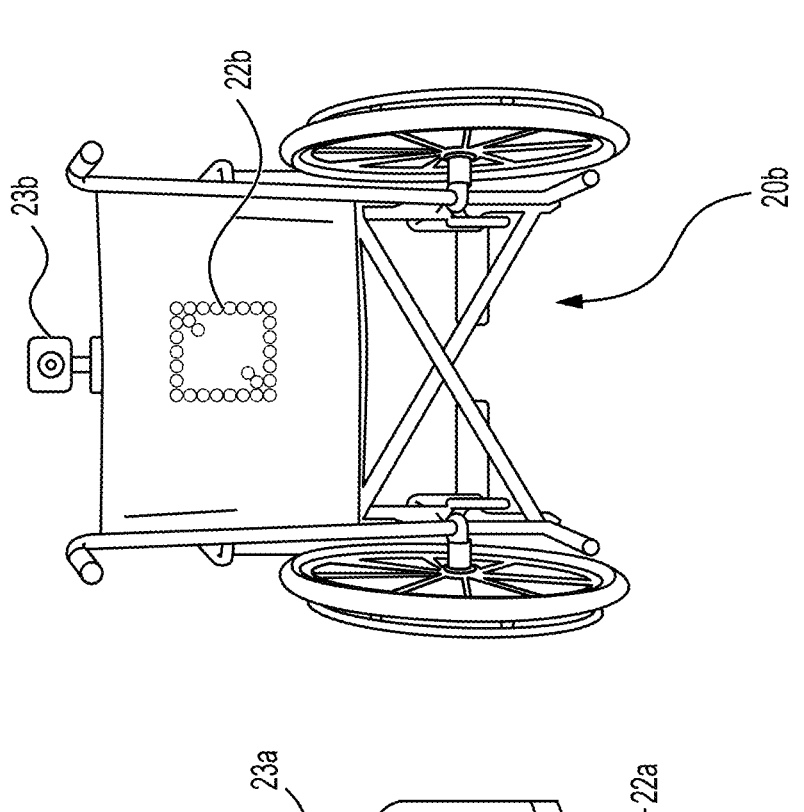
FIG. 2 illustrates alternative embodiments of a user-associated imaging device (UAID) implemented on a hospital bed and a wheelchair.
Figure 2:
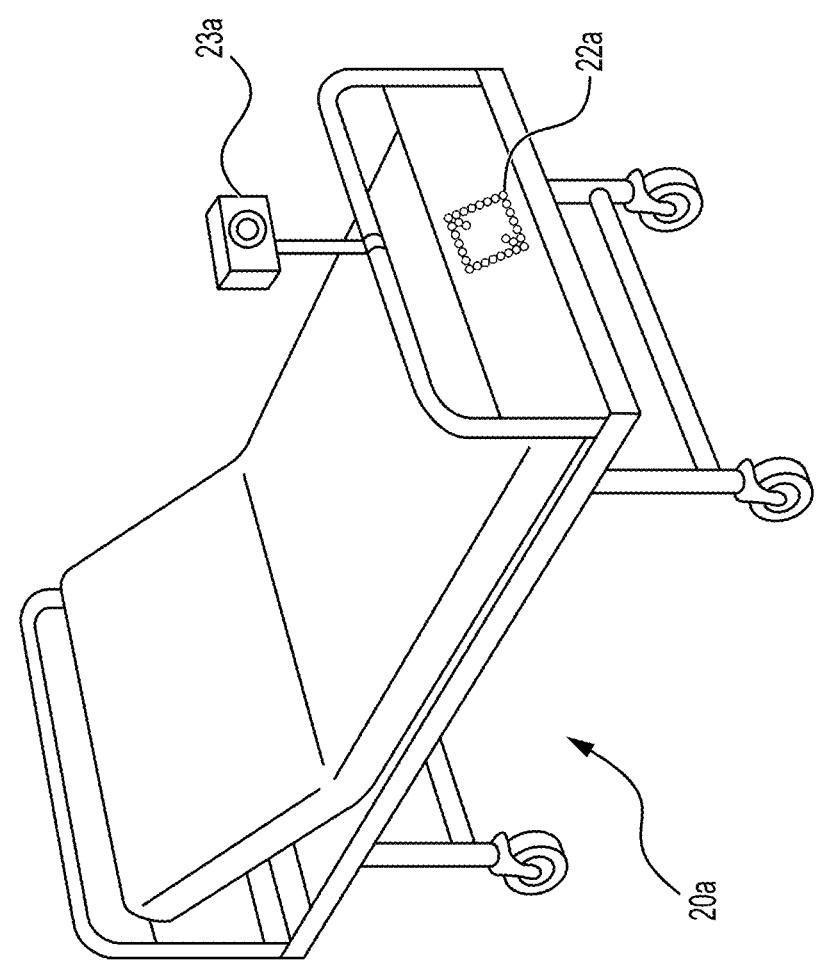

As examples, FIG. 2 illustrates alternative embodiments of the UAID 20 configured for use with different mobile or stationary platforms. In one embodiment, a UAID 20a is implemented as a hospital bed equipped with a UAID tag 22a positioned at a visible location on the bed frame and a UAID camera 23a mounted near the foot of the bed. In another embodiment, a UAID 20b is implemented as a wheelchair including a UAID tag 22b affixed to the rear surface of the chair and a UAID camera 23b mounted at an elevated position above the backrest. Each of the UAID platforms 20a and 20b may incorporate the processing, memory, and communication components described above in connection with FIGS. 1A-1B. The outward-facing UAID cameras 23a and 23b are configured to capture images of environment-specific tags within the indoor environment, while the tags 22a and 22b provide visible identifiers for localization by fixed cameras. These embodiments demonstrate that the system 1 can be implemented with UAIDs integrated into various mobile support devices such as hospital beds, wheelchairs, carts, or other patient-associated platforms to facilitate automatic location tracking and monitoring within healthcare or assisted-living environments. Each such UAID platform may be registered within the system such that its unique UAID identifier is linked to a corresponding patient record or user profile in a facility database. In this way, the hospital bed or wheelchair is electronically associated with a specific patient, enabling the image-tag processing system to correlate a detected location of the UAID with the assigned individual.

Figure 3A:
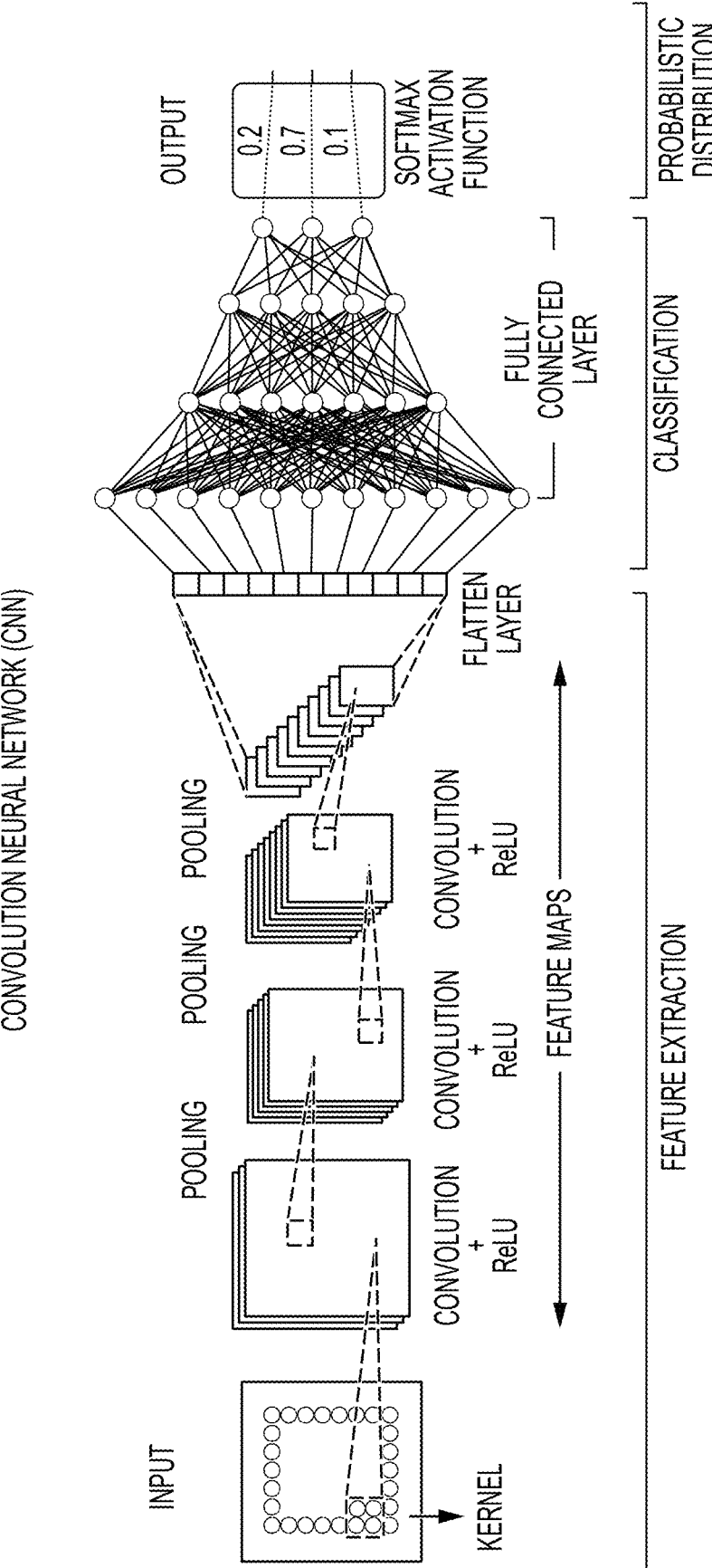
FIG. 3A is a schematic representation of a convolutional neural network (CNN) architecture.

Referring now to FIG. 3A, there is shown a schematic representation of a non-limiting example of a convolutional neural network (CNN) architecture suitable for use in the image-tag processing system (ITPS) 30. The CNN model is configured to receive as input an image or image segment containing one or more environment-specific tags and to generate an output corresponding to a predicted classification, distance, or angle parameter. The CNN includes a sequence of layers performing feature extraction, classification, and probabilistic output generation.

In the feature-extraction stage, an input image is processed by one or more convolutional layers, each applying a set of kernels to extract local spatial features and produce a series of feature maps. Each convolutional layer is followed by a nonlinear activation function, such as a rectified linear unit (ReLU), to introduce nonlinearity and improve model expressiveness. Pooling layers are interspersed between convolutional stages to perform spatial downsampling, thereby reducing dimensionality and computational complexity while preserving essential feature information. The resulting feature maps are then flattened into a one-dimensional representation that captures the hierarchical features of the input image.

In the classification stage, the flattened feature representation is processed by one or more fully connected layers that learn global relationships between extracted features. The final layer employs a SoftMax activation function to produce a probabilistic distribution over possible output classes or continuous values, such as tag identifiers, estimated distances, or estimated angles. During training, the CNN parameters are optimized using supervised learning techniques, such as stochastic gradient descent or Adam optimization, based on labeled image data of known tag positions and orientations.

The CNN architecture illustrated in FIG. 3A may be implemented using standard deep-learning frameworks and may be configured as a lightweight network for real-time inference on embedded processors within the ITPS 30, or in other embodiments on the UAID 20. The CNN may alternatively be deployed in a distributed computing environment, allowing the ITPS 30 to process image data transmitted wirelessly from multiple UAIDs 20 in parallel. In operation, the trained CNN model enables automatic feature extraction and classification of environment-specific tags, facilitating rapid and accurate localization within the indoor environment without the need for explicit geometric calibration or manual feature engineering.

Figure 3B:
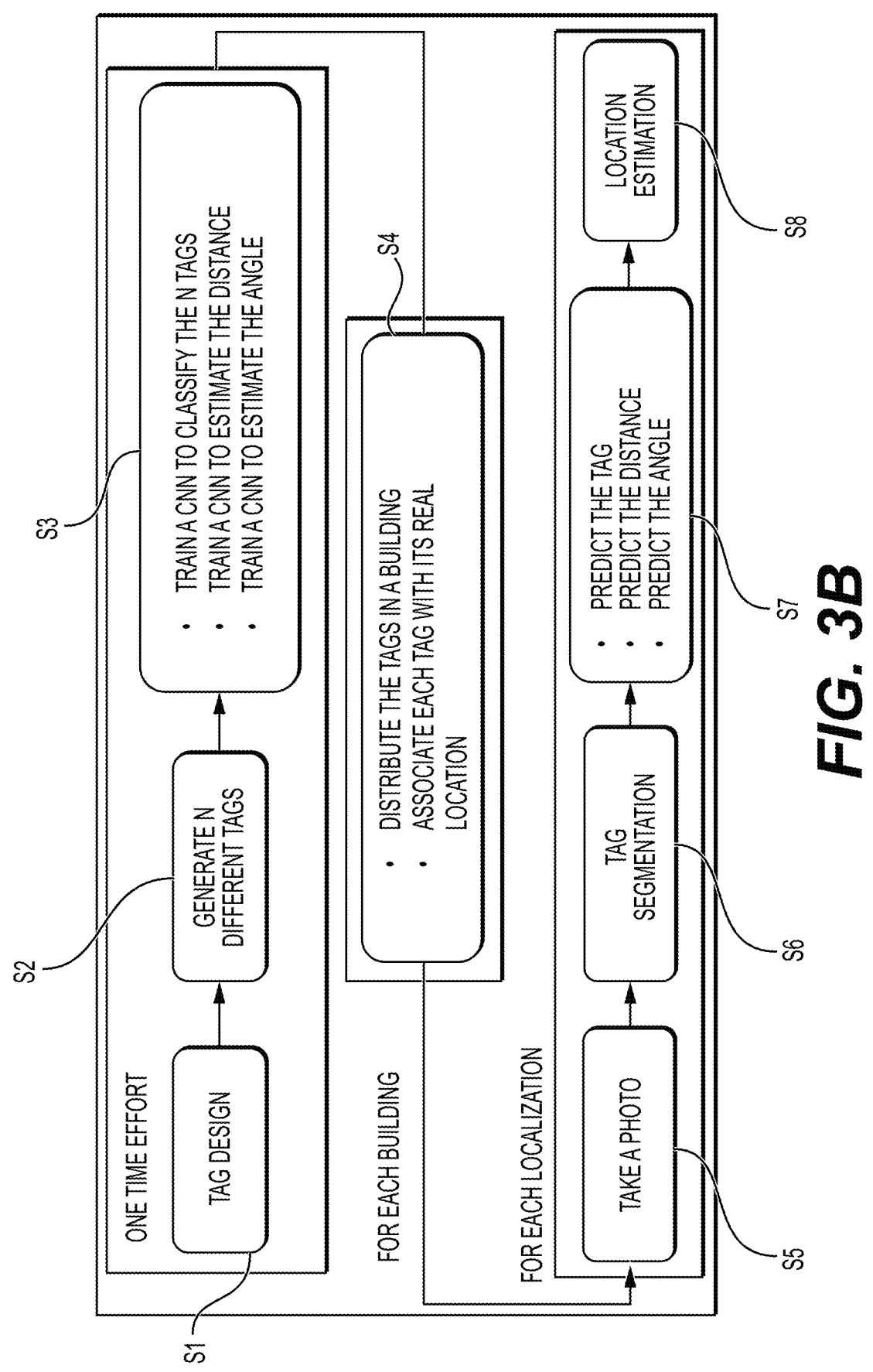
FIG. 3B is a flow diagram illustrating an exemplary image-tag localization and training process.

Referring now to FIG. 3B, there is shown a flow diagram illustrating an exemplary image-tag localization and training process implemented by the image-tag processing system (ITPS) 30. The process includes an initial one-time setup phase (steps S1-S3), an environment preparation phase (step S4), and a localization or inference phase (steps S5-S8).

In step S1, a plurality of environment-specific tags are designed. Each tag possesses a unique geometric or fiducial pattern that may be optically recognized and classified by the trained convolutional neural network (CNN) model(s) 36. In step S2, N different tags are generated, where N is selected to provide sufficient coverage for the size or complexity of the indoor environment in which the system will operate. In step S3, the CNN model(s) 36 is/are trained respectively to (i) classify the N different tags, (ii) estimate the distance between the user-associated imaging device (UAID) camera 23 and a detected tag, and (iii) estimate the viewing angle between the camera optical axis and a line perpendicular to the plane of the detected tag. These training operations may be performed once and thereafter can be applied across environments with minimal or no retraining.

Following model training, step S4 represents deployment within a specific facility. The environment-specific tags used during training are distributed throughout the indoor environment and each environment-specific tag is associated with its known physical location, such as by registration in a facility map or database accessible to the ITPS 30. For real-time localization, the system executes steps S5-S8. In step S5, the UAID camera 23 automatically captures an image of the surrounding environment, for example when a stationary condition or other triggering event is detected as previously described. In step S6, tag segmentation is performed to isolate any visible environment-specific tags from the captured image. In step S7, the pre-trained CNN model (s) 36 are executed to predict the tag identifier, estimate the distance between the camera and each detected tag, and determine the viewing angle relative to the tag's perpendicular reference line. In step S8, the ITPS 30 calculates the position of the UAID 20 within the indoor environment based on the predicted parameters. If multiple tags are detected, distance estimates from the respective tags may be combined to improve positional accuracy in a manner analogous to multilateration or radio-frequency localization techniques.

The process illustrated in FIG. 3B thereby enables efficient training and rapid deployment of a CNN-based indoor localization framework that accurately determines a user's position from image-tag data captured by the UAID camera 23 without requiring explicit geometric calibration for each environment.

Figures 4A, 4B:
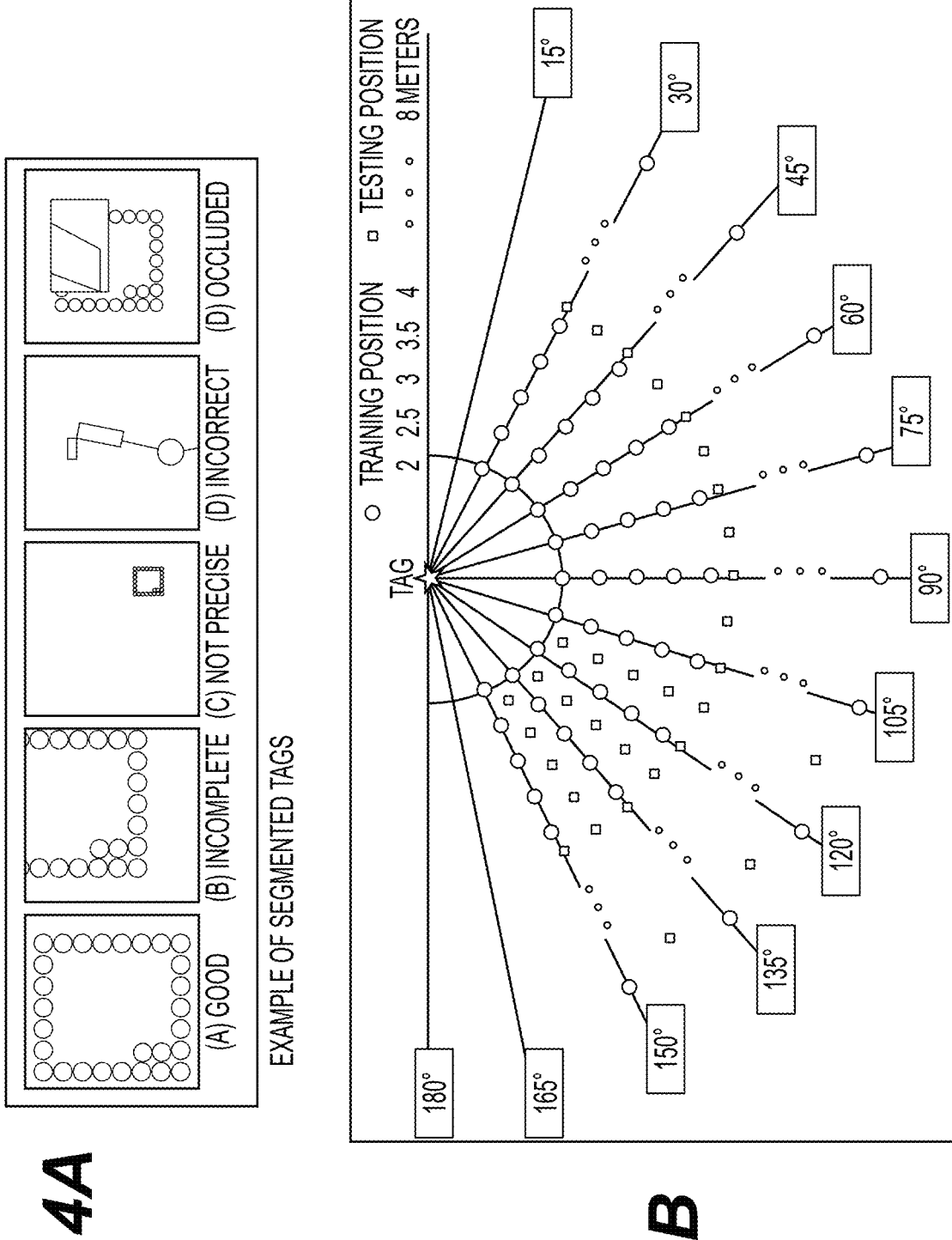
FIG. 4A illustrates examples of segmented tag detections obtained during an image pre-processing stage.
FIG. 4B illustrates an experimental setup used for collecting training and testing data for the convolutional neural network (CNN) models used in distance and angle estimation.

Referring now to FIG. 4A, there are shown examples of segmented tags obtained during the image pre-processing stage of the image-tag localization system. The figure illustrates representative outcomes of tag segmentation, including (a) a good segmentation in which the tag is completely and accurately detected, (b) an incomplete segmentation in which only a portion of the tag is detected, (c) a not-precise segmentation in which the detected boundary deviates from the actual tag shape, (d) an incorrect segmentation corresponding to a non-tag region erroneously identified as a tag, and (e) an occluded segmentation in which the tag is partially obstructed by other objects.

In certain implementations, the system differentiates between incomplete and occluded segmentations by analyzing the spatial continuity and boundary characteristics of the detected tag region. For example, an incomplete segmentation typically presents a uniform partial tag pattern with missing boundary features but consistent internal geometry, whereas an occluded segmentation exhibits irregular edge discontinuities and adjacent non-tag pixel regions classified as obstruction. The CNN or accompanying pre-filtering stage may apply heuristics based on contour completeness, edge variance, or contextual object-mask information to classify the segmentation type, allowing occluded samples to be flagged or excluded from distance and angle estimation.

In the disclosed implementation, conventional deep-learning object-detection frameworks such as Single Shot MultiBox Detector (SSD) and You Only Look Once (YOLO) were determined to be less suitable due to the extensive manually labeled data required for training and the difficulty of re-labeling when adapting to new tag geometries or camera lenses. Accordingly, a template-matching approach was adopted for tag detection and segmentation. This method relies on identifying the characteristic square feature of the tag rather than its precise boundary, thereby improving robustness to viewing-angle and distance variations.

The segmentation process involves three principal steps: key-feature searching, hierarchical clustering, and prediction. During key-feature searching, the system extracts and locates distinctive features in the input image that correspond to the known tag template. In the second step, hierarchical clustering is applied to group the detected key features into clusters based on spatial proximity and similarity thresholds. Each resulting cluster defines a candidate region, which is then cropped using a square bounding window that encloses the clustered features. The resulting segmented patches may correspond to complete tags, incomplete or occluded tags, or non-tag regions, as exemplified in FIG. 4A. This hierarchical template-matching approach provides a simple, accurate, and computationally efficient method for identifying tag regions under varying illumination and viewing conditions, enabling robust input to the CNN models 36 for subsequent tag classification, distance estimation, and angle prediction.

The publication "Image-Tag-Based Indoor Localization Using End-to-End Learning," International Journal of Distributed Sensor Networks, Vol. 17, No. 11 (2021), by Mohammed Alarfaj, Zhenqiang Su, Raymond Liu, Abdulaziz Al-Humam, and Huaping Liu, is hereby incorporated by reference in its entirety for all purposes. This reference provides additional background information concerning image-tag-based localization frameworks, convolutional neural-network training, and tag segmentation methodologies that may be utilized in connection with the embodiments described herein.

Referring now to FIG. 4B, there is shown an experimental setup used for collecting training and testing data for the convolutional neural network (CNN) models described herein. The figure illustrates the spatial arrangement of environmental tags and camera positions used to generate the dataset for distance and angle estimation. Each tag was printed in black and white with a size of approximately 19 cm×19 cm, and ten distinct tag patterns were used to evaluate the tag-segmentation and classification performance. The tags were affixed to interior walls, and photographs were captured from multiple distances, angles, and lighting conditions.

As shown in FIG. 4B, the tag is positioned at the origin, and a series of camera positions are distributed radially around the tag at angular intervals ranging from 15° to 180°. A total of 117 training positions and 46 testing positions were established within a maximum range of approximately 8 meters. At each position, approximately 300 photographs were taken using the burst-capture function of the camera to accelerate image acquisition. This approach introduced motion blur and lighting variation, thereby providing a realistic dataset for CNN training and validation.

The resulting dataset included approximately 10,000 images across all tags, of which about 9,100 were successfully segmented using the proposed hierarchical template-matching technique. Each segmented tag image was labeled with its corresponding tag identifier, distance, and angle. To ensure consistent input dimensions for CNN processing, each segmented tag image was padded to a fixed resolution (for example, 298×298 pixels). The distance and angle values were normalized to the range [0,1] to facilitate regression-based learning, where distance was normalized by 10 meters and angle by 180 degrees.

The classification-based CNN model was trained using approximately 80% of the segmented tag dataset and validated on the remaining 20%, achieving a validation accuracy of about 98%. Separate regression-based CNN models were trained for distance and angle estimation using the normalized data. During training, the camera height was maintained constant so that only the x- and y-coordinates were considered in a two-dimensional (2D) localization configuration. The arrangement shown in FIG. 4B therefore represents the spatial geometry used to train and validate the CNN models for accurate distance and angular prediction from image-tag data, forming the foundation of the localization framework described herein.

Similarly to the training processes described above with regards to the UAID cameras 23, the fixed cameras 14 may also be trained or calibrated to detect and identify UAID tags 22 associated with individual users. Such training may employ the same or similar CNN models 36 described herein, or alternative machine-learning architectures configured to recognize tag patterns from varying perspectives and lighting conditions. The fixed cameras 14 may initially be calibrated by capturing images of one or more reference UAID tags at known positions within the environment to establish baseline feature data, positional reference frames, or exposure settings. Thereafter, the trained models may operate autonomously to identify UAID tags 22 in real-time image streams, determine their positions relative to the fixed cameras, and communicate corresponding tag identifiers to the image-tag processing system 30. This process enables seamless coordination between the fixed camera network and the UAID devices for comprehensive user tracking and identification throughout the indoor environment.

Accordingly, the system provided by the present disclosure integrates environment tagging, user identification, CNN-based image analysis, motion sensing, and physiological monitoring within a unified framework. This arrangement enables accurate and reliable real-time indoor localization and tracking, automated fall detection and alerting, and seamless communication with remote monitoring or emergency-response systems.

It is to be understood that the systems and methods for indoor tag localization and identification are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A system for indoor tag localization and identification, comprising:

an environment-specific tag disposed at a predetermined position within an indoor environment, the environment-specific tag comprising a unique identifier associated with a corresponding indoor environment location;

a user-associated imaging device (UAID) including a UAID processor, a UAID memory, UAID camera and a UAID tag, wherein:

the UAID is configured to be carried by, attached to, or positioned proximate to a user of the UAID;

the UAID camera is configured to be directed outward from the user of the UAID and capture images of the indoor environment location including the environment-specific tag; and the UAID tag is coupled to or associated with the UAID for external identification, wherein the UAID is configured to associate the UAID tag with a UAID identifier and a user identifier, wherein the UAID identifier is associated with the UAID, and the user identifier is associated with a user of the UAID;

a fixed camera positioned within the indoor environment and configured to capture images of the UAID tag; and an image tag processing system (ITPS) comprising an ITPS processor, an ITPS memory, and one or more trained convolutional neural network (CNN) models, wherein the ITPS is operatively connected to an output device and configured to:

receive environment-tag image data from the UAID, and execute at least one of the one or more trained CNN models to predict the indoor environment location of the UAID and a distance of the UAID from the environment-specific tag based on outputs of the one or more trained CNN models;

receive UAID-tag image data from the fixed camera and execute at least one of the one or more trained CNN models to predict the UAID identifier and the user identifier of the UAID based on the UAID-tag image data; and output, on the output device, information selected from the group consisting of: the UAID identifier, the user identifier, the indoor environment location of the UAID, the distance of the UAID from the environment-specific tag, and combinations thereof.

2. The system of claim 1, wherein the UAID further comprises an inertial measurement unit (IMU) configured to measure linear acceleration and angular velocity, and wherein the ITPS is configured to receive data regarding the linear acceleration and angular velocity from the UAID.

3. The system of claim 2, wherein the ITPS is configured to detect a fall or abnormal movement pattern based on data from the IMU and to generate an alert message via the output device, the alert message being selected from the group consisting of: a visual indication, an audible signal, a haptic or tactile signal, a wireless transmission to a remote computing device or network server, and combinations thereof.

4. The system of claim 3, wherein the alert message includes information selected from the group consisting of: the UAID identifier, the user identifier, the indoor environment location of the UAID, the distance of the UAID from the environment-specific tag, and combinations thereof.

5. The system of claim 2, wherein the UAID is a smartwatch or smart bracelet.

6. The system of claim 1, wherein the UAID comprises at least one physiological sensor configured to measure at least one physiological parameter of the user of the UAID.

7. The system of claim 6, wherein the at least one physiological parameter is selected from the group consisting of: heart rate, blood oxygen level, body temperature, blood pressure, and combinations thereof.

8. The system of claim 1, wherein the UAID is mounted to a mobile platform selected from the group consisting of: a wheelchair, bed, cart, or walker.

9. The system of claim 1, wherein the ITPS is further configured to determine a pose vector of the UAID relative to the environment-specific tag based on the environment-tag image data received from the UAID.

10. The system of claim 1, wherein the output device produces an output from the group consisting of: a visual display, an audible message, a haptic or tactile signal, a wireless transmission to a remote computing device or network server, and combinations thereof.

11. A method for indoor tag localization and identification, comprising:

disposing an environment-specific tag at a predetermined position within an indoor environment, the environment-specific tag having a unique identifier associated with a corresponding indoor environment location;

providing a user-associated imaging device (UAID) including a UAID processor, UAID memory, UAID camera, and UAID tag, wherein the UAID is configured to be carried by or attached to a user and the UAID camera is directed outward from the user;

capturing, by the UAID camera, one or more images of the indoor environment including the environment-specific tag;

capturing, by a fixed camera positioned within the indoor environment, one or more images of the UAID tag;

receiving, at an image-tag processing system (ITPS), environment-tag image data from the UAID and UAID-tag image data from the fixed camera;

executing, by the ITPS, one or more trained convolutional neural network (CNN) models to:

predict an indoor environment location of the UAID and a distance of the UAID from the environment-specific tag based on the environment-tag image data;

predict a UAID identifier and a user identifier based on the UAID-tag image data; and outputting, via an output device operatively connected to the ITPS, information selected from the group consisting of: the UAID identifier, the user identifier, the indoor environment location of the UAID, the distance of the UAID from the environment-specific tag, and combinations thereof.

12. The method of claim 11, further comprising receiving inertial measurement data from an inertial measurement unit (IMU) of the UAID, the inertial measurement data including linear acceleration and angular velocity.

13. The method of claim 12, further comprising detecting a fall or abnormal movement pattern based on the inertial measurement data and, in response, generating and outputting an alert message via the output device, the alert message being selected from the group consisting of: a visual indication, an audible signal, a haptic or tactile signal, a wireless transmission to a remote computing device or network server, and combinations thereof.

14. The method of claim 12, wherein the alert message includes information selected from the group consisting of: the UAID identifier, the user identifier, the indoor environment location of the UAID, the distance of the UAID from the environment-specific tag, and combinations thereof.

15. The method of claim 11, wherein the UAID is a smartwatch or smart bracelet.

16. The method of claim 11, further comprising measuring, by the UAID, at least one physiological parameter of the user using at least one physiological sensor.

17. The method of claim 16, wherein the at least one physiological parameter is selected from the group consisting of: heart rate, blood oxygen level, body temperature, blood pressure, and combinations thereof.

18. The method of claim 11, wherein the UAID is mounted to a mobile platform selected from the group consisting of: a wheelchair, bed, cart, or walker.

19. The method of claim 11, further comprising determining a pose vector of the UAID relative to the environment-specific tag based on geometric distortion of the environment-specific tag in the captured images.

20. The method of claim 11, wherein the output device produces an output selected from the group consisting of: a visual display, an audible message, a haptic or tactile signal, a wireless transmission to a remote computing device or network server, and combinations thereof.

\* \* \* \* \*